United States Patent
Edsall et al.

(10) Patent No.: US 9,077,619 B2
(45) Date of Patent: Jul. 7, 2015

(54) EXPORTING REAL TIME NETWORK TRAFFIC LATENCY AND BUFFER OCCUPANCY

(71) Applicant: Cisco Technology, Inc., San Jose, CA (US)

(72) Inventors: Thomas J. Edsall, Los Gatos, CA (US); Yue J. Yang, San Jose, CA (US); Wei-Jen Huang, Burlingame, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 13/708,265

(22) Filed: Dec. 7, 2012

(65) Prior Publication Data

US 2014/0078915 A1  Mar. 20, 2014

Related U.S. Application Data

(60) Provisional application No. 61/702,320, filed on Sep. 18, 2012.

(51) Int. Cl.
*H04L 12/26* (2006.01)
*H04L 12/851* (2013.01)
*H04L 12/835* (2013.01)

(52) U.S. Cl.
CPC .............. *H04L 43/08* (2013.01); *H04L 47/24* (2013.01); *H04L 47/30* (2013.01)

(58) Field of Classification Search
CPC ................................ H04W 24/00; H04L 47/10

USPC .................................................. 370/235, 252
See application file for complete search history.

(56) References Cited

U.S. PATENT DOCUMENTS

| | | |
|---|---|---|
| 6,246,684 B1 | 6/2001 | Chapman et al. |
| 6,892,237 B1 | 5/2005 | Gai et al. |
| 6,990,202 B2 | 1/2006 | Wee et al. |
| 7,106,731 B1 | 9/2006 | Lin et al. |
| 7,395,332 B2 | 7/2008 | Gai et al. |
| 7,474,666 B2 | 1/2009 | Kloth et al. |
| 7,656,818 B1 | 2/2010 | Baroudi et al. |
| 7,830,793 B2 | 11/2010 | Gai et al. |

(Continued)

FOREIGN PATENT DOCUMENTS

GB        2477640 A     8/2011

OTHER PUBLICATIONS

International Search Report and Written Opinion in counterpart International Application No. PCT/US2013/059180, mailed Nov. 28, 2013, 10 pages.

(Continued)

*Primary Examiner* — Afshawn Towfighi
(74) *Attorney, Agent, or Firm* — Edell, Shapiro & Finnan LLC

(57) ABSTRACT

Techniques are presented herein to facilitate the monitoring of occupancy of a buffer in a network device. Packets are received at a network device. Information is captured describing occupancy of the buffer caused by packet flow through the buffer in the network device. Analytics packets are generated containing the information. The analytics packets from the network device for retrieval of the information contained therein for analysis, replay of buffer occupancy, etc.

26 Claims, 6 Drawing Sheets

(56) References Cited

U.S. PATENT DOCUMENTS

| | | | |
|---|---|---|---|
| 7,899,048 B1 | 3/2011 | Walker et al. | |
| 7,961,621 B2 | 6/2011 | Bergamasco et al. | |
| 7,969,971 B2 | 6/2011 | Gai et al. | |
| 8,208,389 B2 | 6/2012 | Alaria et al. | |
| 8,640,036 B2 | 1/2014 | Pignataro et al. | |
| 2003/0007456 A1* | 1/2003 | Gupta et al. | 370/232 |
| 2003/0231596 A1 | 12/2003 | Hong | |
| 2005/0240745 A1 | 10/2005 | Iyer et al. | |
| 2006/0062209 A1 | 3/2006 | Riley | |
| 2006/0253900 A1 | 11/2006 | Paddon et al. | |
| 2006/0268847 A1 | 11/2006 | Halbraich et al. | |
| 2009/0034416 A1 | 2/2009 | Baron et al. | |
| 2009/0041011 A1 | 2/2009 | Sheppard | |
| 2009/0100040 A1 | 4/2009 | Sheppard et al. | |
| 2009/0171474 A1 | 7/2009 | Birze et al. | |
| 2010/0054152 A1 | 3/2010 | Foschiano et al. | |
| 2010/0154033 A1 | 6/2010 | Oulai | |
| 2010/0287297 A1 | 11/2010 | Lefebvre | |
| 2012/0093505 A1 | 4/2012 | Yeap et al. | |

OTHER PUBLICATIONS

Cisco Systems, Inc., "Cisco Nexus 3000 Series NX-OS Release Notes, Release 5.0(3)U2(1)," pp. 1-12, Aug. 31, 2011.

* cited by examiner

EXPORTING REAL TIME NETWORK TRAFFIC LATENCY AND BUFFER OCCUPANCY

RELATED APPLICATIONS

This application claims priority to U.S. Provisional Application No. 61/702,320, filed Sep. 18, 2012, entitled "Exporting Real Time Network Traffic Latency and Buffer Occupancy," the entirety of which is incorporated herein by reference.

TECHNICAL FIELD

The present disclosure relates generally to analysis of occupancy of a buffer in a network device.

BACKGROUND

In a computer network, data is transmitted from a source to a destination in the form of packets that generally pass through one or more network devices (e.g., switches, routers, firewalls, etc.). During the transmission, certain errors may arise that result in, for example, redundant data being added to the original data, dropped packets, etc. Massively Scalable Data Center and Cloud Computing systems are putting more traffic load on network equipment such that over-provisioned networks are no longer possible. Monitoring of a buffer in a network device is useful to gain knowledge for network administration, analysis, and performance.

DESCRIPTION OF EXAMPLE EMBODIMENTS

Overview

Techniques are presented herein to facilitate the monitoring of occupancy of a buffer in a network device. Packets are received at a network device. Information is captured describing occupancy of the buffer caused by packet flow through the buffer in the network device. Analytics packets are generated containing the information. The analytics packets from the network device for retrieval of the information contained therein for analysis, replay of buffer occupancy, etc.

Example Embodiments

Complete network visibility into buffer occupancy and the ability to replay occupancy via export and post processing is important since network disruptions (e.g., microbursts) can occur at any time. Furthermore, the ability to replay buffer occupancy allows for effective diagnosis of network issues to provide corrective actions. Existing solutions such as port mirroring (i.e., Switched Port Analyzer (SPAN)) do not provide visibility of buffer occupancy. As such, presented herein are techniques for monitoring and replaying buffer occupancy.

Figure 1:
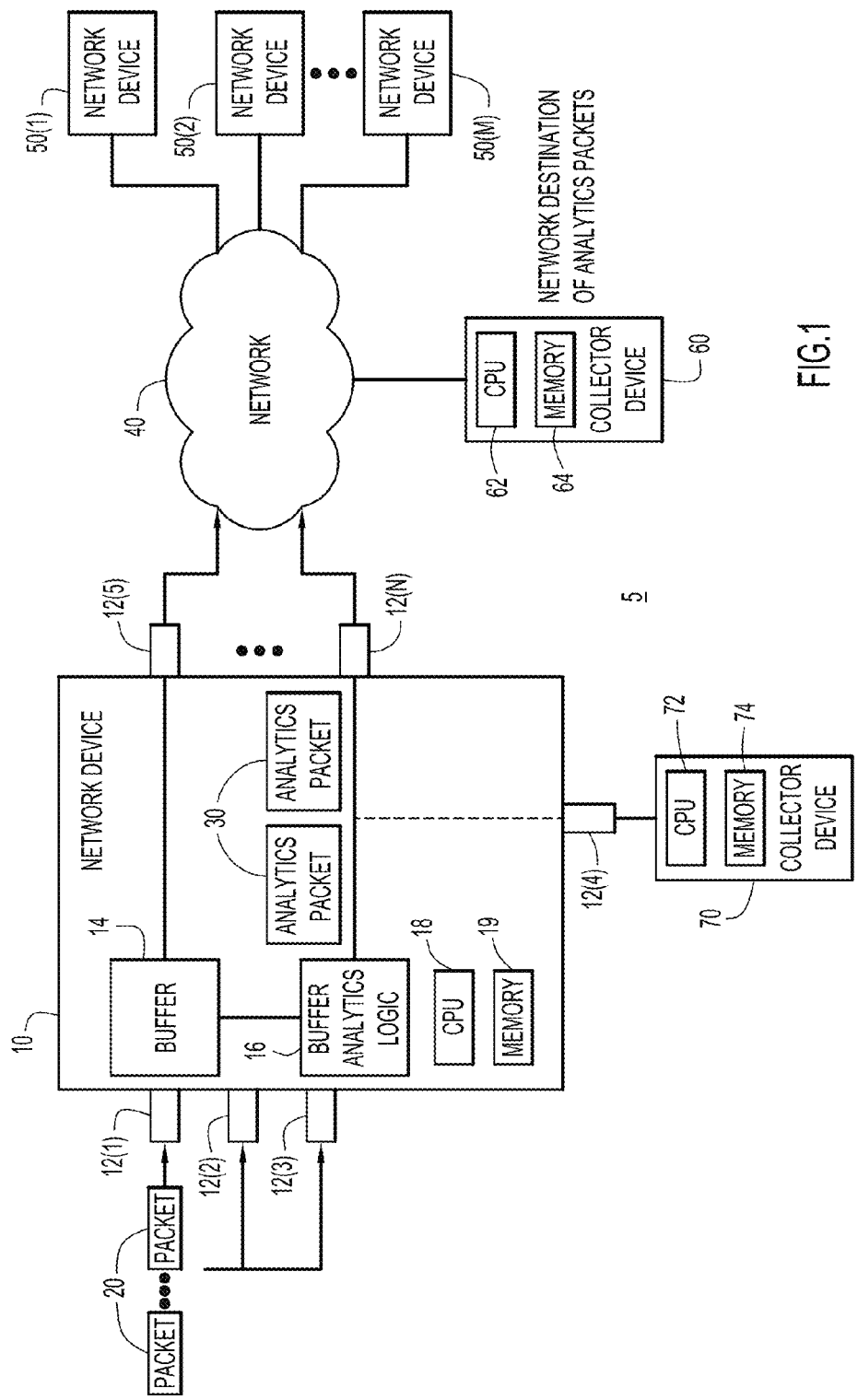
FIG. 1 is a diagram illustrating a network device configured to generate buffer analytics packets based on occupancy of a buffer in the network device.

Referring now to FIG. 1, a diagram is shown of a network environment 5 in which a network device 10 is provided that is configured to generate buffer analytics packets based on occupancy of a buffer the network device 10. The network device 10 comprises a plurality of ports 12(1)-12(N), any of which can serve as an ingress port or egress port at any time. The network device includes a buffer 14, buffer analytics logic 16, a central processing unit (CPU) 18 and memory 19. It should be understood that there are other components of the network device 10, such as a switch fabric or application specific integrated circuit (ASIC), and the buffer 14 may reside the switch fabric. There are typically numerous buffers in the network device 10, but for simplicity only one is shown in FIG. 1. It should be understood that the techniques presented herein are useful for each of a plurality of buffers in a network device. The buffer analytics logic 14 may be implemented in hardware by digital logic gates (and embedded in the switch fabric) or by software stored in memory 19 and executed by CPU 18.

Packets 20 arrive at the network device 10 via any of the ports 12(1)-12(N). FIG. 1 shows an example where packets are arriving at ports 12(1), 12(2) and 12(3). The network device 10 is coupled to a network 40, e.g., a local area network or wide area network (the Internet), via ports 12(5)-12(N) to ultimately communicate with any one or more of the network devices 50(1)-50(M).

Generally, the buffer analytics logic 16 captures information describing occupancy of the buffer 14 caused by packet flow through the buffer in the network device 10, and generates buffer analytics packets 30 containing the information. As will become apparent from the description below in connection with FIG. 2, there are two types of buffer analytics packets: enqueue buffer analytics packets and dequeue buffer analytics packets. The buffer analytics packets 30 are then output from the network device 10 at a programmable time schedule (or based on packet size) in any one of several ways to allow for replay of the occupancy of the buffer.

First, the network device 10 may insert into buffer analytics packets 30 an address for a destination of the buffer analytics packet, e.g., address for any device connected to the network 40, such as collector device 60 having a CPU 62 and memory 64. The network device 10 sends the analytics packet 30 via network 40 to the destination collector device 60, which may be at any location, local or remote from network device 10.

Second, the network device 10 may output the analytics packet 30 to a dedicated port, e.g., port 12(4) of the network device 10 to which a collector device 70 is connected. The dedicated analytics port 12(4) can participate in port channel or fixed port distribution to expand bandwidth to a single or multiple monitor ports. The collector device 70, since it is connected directly to port 12(4), is usually local to the network device 10. The collector device 70 includes a CPU 72 and memory 74.

Third, the analytics packets 30 may be output to the onboard CPU 18 and memory 19 in the network device 10, such that CPU 18 and memory 19 also serve as a collector device. In any of these scenarios, the CPUs 18, 62 and 72 may replay and analyze the occupancy of the buffer 14 based on software instructions stored in its associated memory 19, 64 and 74, respectively. Moreover, the analytics packets are stored in the memory 19, 64 and 74 for the associated CPU 18, 62 and 72, respectively.

The network device 10 can be any network device now known or hereinafter developed, including a switch, router, gateway, a software stack on a host device, virtual network interface cards (VNICs) virtual switches, physical network interface cards (including those that support virtualization).

Memory 19, 64 and 74 may comprise read only memory (ROM), random access memory (RAM), magnetic disk storage media devices, optical storage media devices, flash memory devices, electrical, optical, or other physical/tangible memory storage devices. Thus, in general, the memory 19, 64 and 74 may comprise one or more tangible (non-transitory) computer readable storage media (e.g., a memory device) encoded with software comprising computer executable instructions and when the software is executed (by the associated CPU) it is operable to perform the operations described herein.

Figure 2:
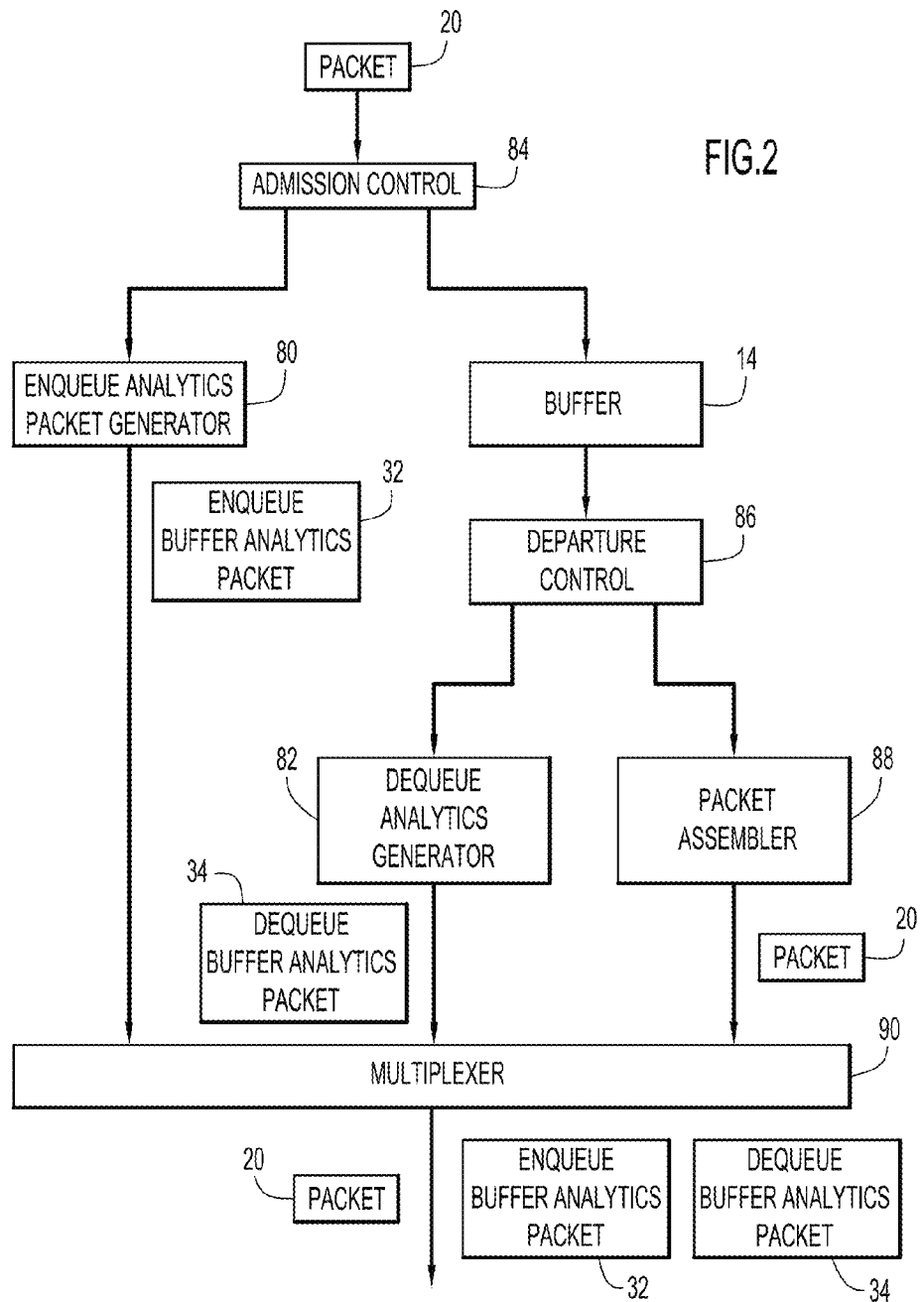
FIG. 2 is a block diagram illustrating one example implementation of the buffer analytics logic.

Reference is now made to FIG. 2 for a more detailed description of the buffer analytics logic 16. FIG. 2 shows that the buffer analytics logic 16 comprises an enqueue analytics packet generator 80 and a dequeue analytics packet generator 82. In addition, there are an admission control block 84, a departure control block 86, a packet assembler 88 and a multiplexer 90. The admission control block 84 and departure control block 86 are commonly found in a network device and are hardware (or software) blocks used to make processing decisions, such as a drop, scheduling, rate limiting, policing, shaping, etc.

The enqueue analytics packet generator 80 is configured to generate an analytics packet, called an enqueue buffer analytics packet shown at reference numeral 32, that describes/summarizes a packet being enqueued into buffer 14. Similarly, the dequeue analytics packet generator 82 is configured to generate an analytics packet, called a dequeue buffer analytics packet shown at reference numeral 34, that describes/summarizes a packet being dequeued from buffer 14. The packet assembler 88 assembles a packet 20 ready out from the buffer 14 for output from the network device.

The enqueue analytics packet generator 80 captures, for a packet enqueued to buffer 14, information describing one or more of identification of ingress port of arrival of the packet at the network device, Layer 2 source address and destination address, Layer 3 source address and destination address, Layer 4 source address and destination address, class of service, and timestamp of arrival at the ingress port. Similarly, the dequeue analytics packet generator 82 captures, for a packet dequeued from the buffer 14, information describing one or more of identification of egress port for departure of the packet from the network device, Layer 2 source address and destination address, Layer 3 source address and destination address, and timestamp of departure from the egress port.

The enqueue buffer analytics packet 32 generated by the enqueue analytics packet generator 80, dequeue buffer analytics packet 34 generated by the dequeue analytics packet generator 82, and packet 20 output by the packet assembler 88, are all supplied to a corresponding input of the multiplexer 90. The multiplexer 90 selectively outputs, at any given time, either a packet 20, an enqueue buffer analytics packet 32 or a dequeue buffer analytics packet 34. Priority is given to output of a packet 20 in order to maintain proper flow of network traffic through the network device 10. Trigger for output of an analytics packet may be based on time (according to a schedule) or size of a packet enqueued to the buffer or dequeued from the buffer.

Figure 3:
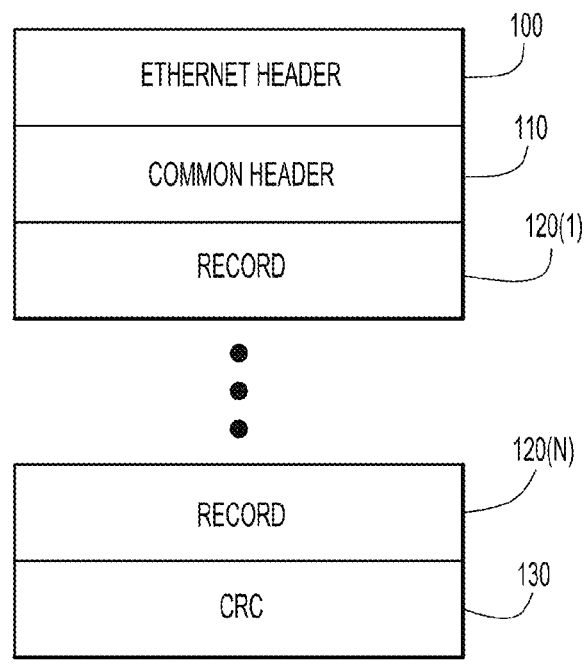
FIG. 3 is a diagram that generally illustrates a format of a buffer analytics packet.

Reference is now made to FIG. 3. FIG. 3 shows an example format of an enqueue buffer analytics packet 32 or dequeue buffer analytics packet 34. As explained above, an enqueue buffer analytics packet 32 summarizes a packet that is being enqueued to a buffer and a dequeue buffer analytics packet 34 summarizes a packet that is being dequeued from the buffer.

These analytics packets, when accumulated over time for packets that pass through the buffer, allow for playback of occupancy characteristics of the buffer and traffic flow of packets through the buffer. As shown in FIG. 3, an enqueue buffer analytics packet 32 and a dequeue buffer analytics packet 34 includes an Ethernet Header field 100, a Common Header field 110, one or more Records fields 120(1)-120(N) and a cyclic redundancy check (CRC) field 130.

The Ethernet header field 110 is field that is used to encapsulate the destination address of the analytics packet, e.g., to direct the analytics packet to a destination, i.e., a local or remote collector device (as indicated in FIG. 1), including to the CPU of the network device itself. To this end, the Ethernet header field 110 includes information, such as media access control (MAC) destination address/source address (DA/SA), optional IEEE 802.1q virtual local area network (VLAN) routing information, an optional Internet Protocol (IP) header including an IP SA and IP DA. Again, the Ethernet header field 110 contains information used to route the buffer analytics packet to its desired destination.

The common header field 110 contains information captured from the header of a packet that has been enqueued to or dequeued (as the case may be) from the buffer. Thus, the common header field summarizes the header of a packet that is enqueued to and dequeued from the buffer in the network device. For example, the common header field includes information for a common header version (to allow for backward/future compatibility), timescale information representing the timescale of the enqueued or dequeued packet, a timestamp of the packet arrival and/or departure to/from the buffer to allow for replay, a record number to allow a collector to determine how many, if any records, have been lost in between the current analytics packet and the last received analytics packet, and one or more user defined fields such as class of service, type of service, etc.

The record field 120 contains data for an enqueued or dequeued packet that a user configures the buffer analytics logic to capture. Examples of data that may be include in a record field includes:

Format version to indicate a format version of the record field for backward/future compatibility.

L2 Header Fields (MAC SA/DA) or compressed versions (i.e. last 24 bits) and priority L3 Header (IP SA/DA) or compressed versions (i.e. last 16 bits) and priority and protocol type L4 Header (TCP/UDP SA/DA)

User defined fields, including one or more of:

Input/output port

Drop—an indication of whether the packet was dropped.

Queue id—identifier of the queue (unicast or multicast) to which the packet is associated.

Queue length—length of the queue to which the packet is associated.

Packet length—overall length of size of the packet.

Timestamp (absolute or relative to common header from protocols such as

Precision Time Protocol (PTP) or Network Time Protocol (NTP))

Programmable bytes—any user configurable one or more bytes of the payload of a packet Internally specific fields such as logical interface mapped from table with keys such as {ingress/egress port, vlan}

Last record—to indicate that this is last record field in the analytics packet.

Thus, to summarize, the record field 120 for an analytics packet contains information about an enqueued packet or dequeued packet to describe buffer occupancy characteristics such as overall buffer occupancy, buffer occupancy based on packet priority, unicast queue length, multicast queue length; packet properties such as drop, port mirrored, load balanced, bridged or routed, and packet length; and packet error properties such as Cyclic Redundancy Check (CRC), and various error protocols such as Runt, Giant, and Jabber. More specifically, for a packet enqueued to the buffer, information is included in the record field describing one or more of identification of ingress port of arrival of the packet at the network device, Layer 2 source address and destination address, Layer 3 source address and destination address, Layer 4 source address and destination address, class of service, and timestamp of arrival at the ingress port. Similarly, for a packet dequeued from the buffer, information is included in the record field describing one or more of identification of egress port for departure of the packet from the network device, Layer 2 source address and destination address, Layer 3 source address and destination address, and timestamp of departure from the egress port. Other examples of data captured into user defined fields include an indication of a packet being rate limited, shaped, policed as well as any programmable bytes of the packet including payload.

The size of the analytics packet (Ethernet header field, common header field and records) may be the Maximum Transmit Unit (MTU), a switch specific analytics MTU, determined using a time-based method (e.g., analytics packet generated and transmitted at predetermined times), determined based on a selected number of packets, or by other techniques.

Figure 4:
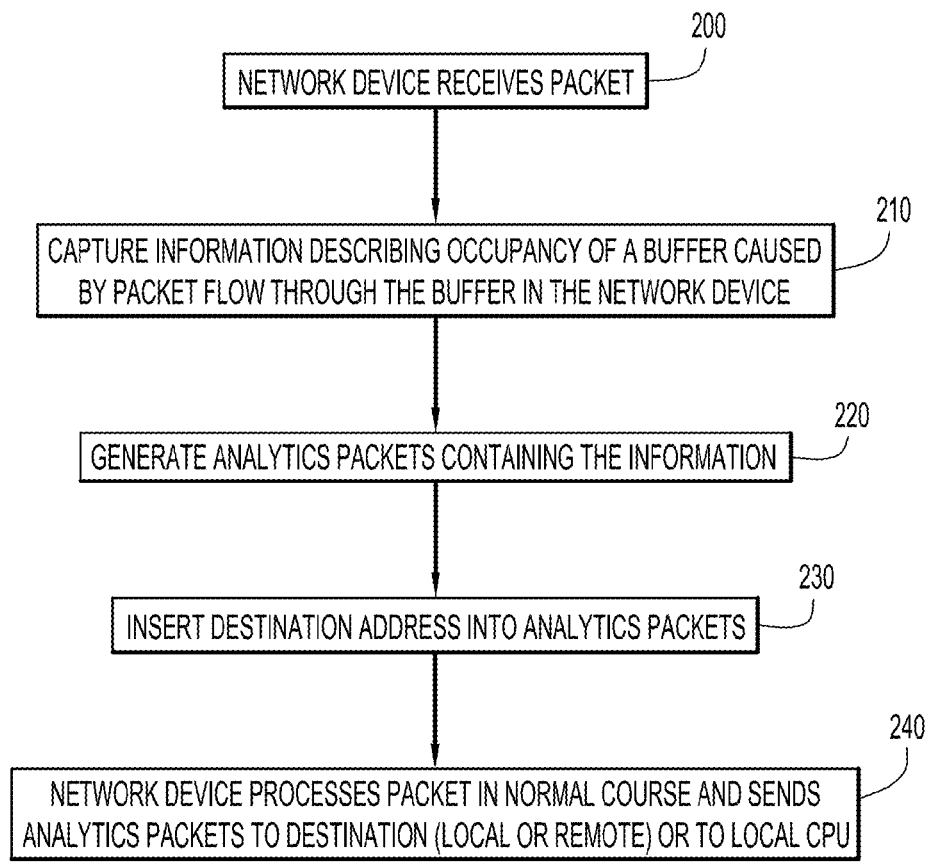
FIG. 4 is a flow chart depicting operations in a network device to generate and output buffer analytics packets.

Reference is now made to FIG. 4. FIG. 4 provides a flow chart that depicts the high level operations performed in a network device in generating and outputting analytics packets. At 200, a network device receives a packet. At 210, the network device captures information describing occupancy of a buffer caused by packet flow through the buffer in the network device. At 220, an analytics packet is generated for each packet that is enqueued to and/or dequeued from the buffer. At 230, a destination address is inserted into the analytics packet. At 240, the network device processes the packet in the normal course, and outputs an analytics packet to its destination (local or remote network destination) or to a local CPU of the network device. The capturing, generating, and outputting operations are triggered to be performed based on at least one of time and size of enqueued packet or dequeued packet.

Figure 5:
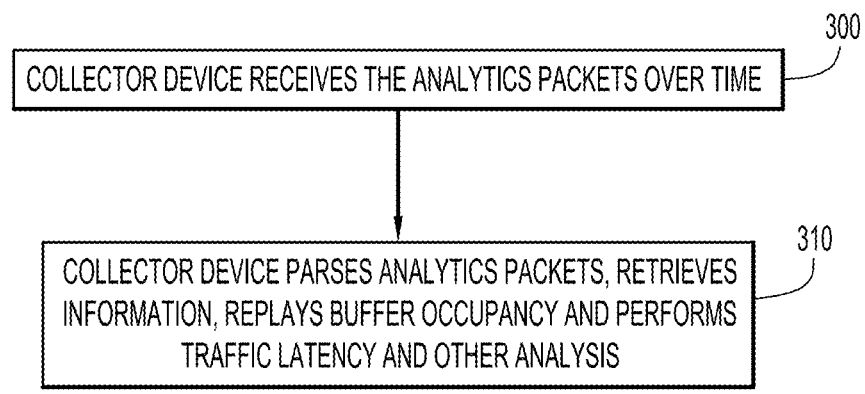
FIG. 5 is a flow chart depicting operations in a device that receives and retrieves information from the buffer analytics packets.

FIG. 5 illustrates a high level flow chart depicting the operations performed at a destination of the analytics packets. At 300, a collector device receives the analytics packets over time. At 310, the collector device parses the analytics packets to retrieve information in the individual records as well as the common header, and uses this information to replay buffer occupancy, perform traffic latency and perform other analysis.

Figure 6:
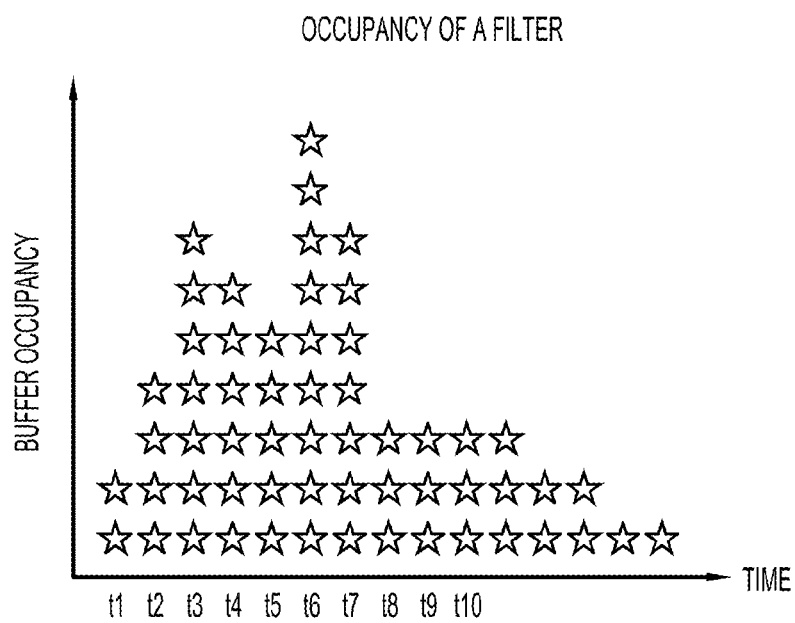
FIG. 6 is a diagram illustrating an example of playback of buffer occupancy from buffer analytics packets.

FIG. 6 shows an example of how a replay of buffer occupancy, subject to certain filtering criteria, may be made. In FIG. 6, a "*" represents data that has been stored into buffer and lack of "*" represents absence or removal of data from the buffer.

By generating and exporting analytics packets that summarize properties of packets enqueued to and dequeued from a buffer in a network device, a replay of the buffer may be achieved using specific pieces of information that are of interest to network administrators and application developers. Recording each of these categories would require enormous bandwidth if a complete enqueued or dequeued packet is captured.

In summary, presented herein are techniques that enable a time-based complete replay of the buffer occupancy with resolution determined by a sampling period. These techniques provide visibility of traffic flows received by network devices. The information provided can be used by network administrators to gain insight into their specific network traffic, such as per-packet latency, buffer occupancy, and possible congestion sources. This information can lead to better allocation and provisioning of network resources, reduced congestion, and higher overall throughput. By parsing and aggregating relevant characteristics from each packet according to the techniques presented herein, bandwidth requirements associated with network monitoring are greatly reduced. As such, these techniques assist in reducing the amount of data exported for analysis.

The above description is intended by way of example only.

What is claimed is:

1. A method comprising:
receiving packets at a network device;
capturing information describing occupancy of a buffer caused by packet flow through the buffer in the network device;
generating analytics packets containing the information comprising:
generating an enqueue analytics packet and a dequeue analytics packet, the enqueue analytics packet including information describing properties associated with a packet being enqueued to the buffer in the network device and the dequeue analytics packet including information describing properties associated with a packet being dequeued from the buffer in the network device, and
inserting an address into the enqueue analytics packet and into the dequeue analytics packet for a destination of the enqueue analytics packet and the dequeue analytics packet; and
sending the enqueue analytics packet and the dequeue analytics packet from the network device to the destination.

2. The method of claim 1, wherein sending comprises outputting the enqueue analytics packet and the dequeue analytics packet to a dedicated port of the network device to which a collector device is connected.

3. The method of claim 1, wherein capturing comprises capturing, for a packet enqueued to the buffer, information describing one or more of: identification of ingress port of arrival of the packet at the network device, Layer 2 source address and destination address, Layer 3 source address and destination address, Layer 4 source address and destination address, class of service, or timestamp of arrival at the ingress port.

4. The method of claim 1, wherein capturing comprises capturing, for a packet dequeued from the buffer, information describing one or more of: identification of egress port for departure of the packet from the network device, Layer 2 source address and destination address, Layer 3 source address and destination address, or timestamp of departure from the egress port.

5. The method of claim 1, wherein the enqueue analytics packet and the dequeue analytics packet include a header containing information to be used for directing the enqueue analytics packet and the dequeue analytics packet to a destination, and the enqueue analytics packet includes a record summarizing a packet enqueued in the buffer and the dequeue analytics packet includes a record summarizing a packet dequeued from the buffer.

6. The method of claim 1, wherein capturing comprises capturing information describing buffer occupancy characteristics of the buffer including at least one of:
  overall buffer occupancy, buffer occupancy for based on packet priority, unicast queue length or multicast queue length.

7. The method of claim 1, wherein capturing comprises capturing information describing packet processing properties for packets processed by the network device including at least one of: drop, port mirrored, load balanced, bridged or routed, or packet length.

8. The method of claim 1, wherein capturing comprises capturing information describing packet processing properties for packets corresponding to user defined parameters for one or more of: rate limited, shaped, policed or any programmable bytes of the packet including payload.

9. The method of claim 1, wherein capturing, generating, and outputting are triggered to be performed based on a predetermined time schedule or based on a size of a packet dequeued from the buffer.

10. The method of claim 1, further comprising replaying the occupancy of the buffer over time.

11. The method of claim 1, wherein the capturing and the generating are triggered to be performed according to a size of a respective packet enqueued in the buffer.

12. An apparatus comprising:
  a buffer to buffer packets that are received at a network device and are to be processed for routing in a network by the network device; and
  a processor coupled to the buffer to:
    capture information describing occupancy of a buffer caused by packet flow through the buffer in the network device;
    generate analytics packets containing the information, wherein when the processor generates the analytics packets, the processor:
      generates an enqueue analytics packet and a dequeue analytics packet, the enqueue analytics packet including information describing properties associated with a packet being enqueued to the buffer in the network device and the dequeue analytics packet including information describing properties associated with a packet being dequeued from the buffer in the network device, and
      inserts an address into the enqueue analytics packet and into the dequeue analytics packet for a destination of the enqueue analytics packet and the dequeue analytics packet; and
      causes the enqueue analytics packet and the dequeue analytics packet to be sent from the network device to the destination.

13. The apparatus of claim 12, wherein the processor generates the enqueue analytics packet and the dequeue analytics packet, each enqueue analytics packet and dequeue analytics packet comprising an Ethernet header field containing information to be used for directing the enqueue analytics packet and the dequeue analytics packet, respectively, the enqueue analytics packet including one or more record fields containing information summarizing data contained in a packet enqueued in the buffer and the dequeue analytics packet including one or more record fields containing information summarizing data contained in a packet dequeued from the buffer.

14. The apparatus of claim 12, wherein the processor captures information describing buffer occupancy characteristics of the buffer including at least one of: overall buffer occupancy, buffer occupancy based on packet priority, unicast queue length or multicast queue length.

15. The apparatus of claim 12, wherein the processor captures information describing packet processing properties for packets corresponding to user defined parameters for one or more of: rate limited, shaped, policed or any programmable bytes of the packet including payload.

16. The apparatus of claim 12, wherein the occupancy of the buffer is sent to the destination to be replayed over time.

17. The apparatus of claim 12, wherein the processor captures the information and generates the enqueue analytics packet and the dequeue analytics packet according to a size of a respective packet enqueued in the buffer.

18. A non-transitory computer readable tangible storage media encoded with instructions that, when executed by a processor, cause the processor to:
  capture information describing occupancy of a buffer caused by packet flow through the buffer in a network device;
  generate analytics packets containing the information, wherein the instructions that cause the processor to generate comprise instructions that cause the processor to:
    generate an enqueue analytics packet and a dequeue analytics packet, the enqueue analytics packet including information describing properties associated with a packet being enqueued to the buffer in the network device and the dequeue analytics packet including information describing properties associated with a packet being dequeued from the buffer in the network device, and
    insert an address into the enqueue analytics packet and into the dequeue analytics packet for a destination of the enqueue analytics packet and the dequeue analytics packet; and
    cause the enqueue analytics packet and the dequeue analytics packet to be sent from the network device to the destination.

19. The non-transitory computer readable tangible storage media of claim 18, wherein each enqueue analytics packet and dequeue analytics packet includes an Ethernet header field containing information to be used for directing the enqueue analytics packet and the dequeue analytics packet, respectively, to a destination, the enqueue analytics packet including one or more record fields containing information summarizing data contained in a packet enqueued in the buffer and the dequeue analytics packet including one or more record fields containing information summarizing data contained in a packet dequeued from the buffer.

20. The non-transitory computer readable tangible storage media of claim 18, wherein the instructions that cause the processor to capture comprise instructions that cause the processor to capture information describing buffer occupancy characteristics of the buffer including at least one of: overall buffer occupancy, buffer occupancy based on packet priority, unicast queue length or multicast queue length.

21. The non-transitory computer readable tangible storage media of claim 18, wherein the instructions that cause the processor to send the enqueue analytics packet and the dequeue analytics packet comprise instructions that cause the processor to output the enqueue analytics packet and the dequeue analytics packet to a dedicated port of the network device to which a collector device is connected.

22. The non-transitory computer readable tangible storage media of claim 18, wherein the instructions that cause the processor to capture the information comprise instructions that cause the processor to capture, for a packet enqueued to the buffer, information describing one or more of: identification of ingress port of arrival of the packet at the network device, Layer 2 source address and destination address, Layer 3 source address and destination address, Layer 4 source address and destination address, class of service, or timestamp of arrival at the ingress port.

23. The non-transitory computer readable tangible storage media of claim 18, wherein the instructions that cause the processor to capture the information comprise instructions that cause the processor to capture, for a packet dequeued from the buffer, information describing one or more of: identification of egress port for departure of the packet from the network device, Layer 2 source address and destination address, Layer 3 source address and destination address, or timestamp of departure from the egress port.

24. The non-transitory computer readable tangible storage media of claim 23, wherein the enqueue analytics packet and dequeue analytics packet are sent to the destination to replay the occupancy of the buffer over time.

25. The non-transitory computer readable tangible storage media of claim 18, wherein the capture and generate operations are triggered to be performed according to a size of a respective packet enqueued in the buffer.

26. The non-transitory computer readable tangible storage media of claim 18, further comprising instructions that, when executed by the processor, cause the processor to replay the occupancy of the buffer over time.

\* \* \* \* \*

UNITED STATES PATENT AND TRADEMARK OFFICE
CERTIFICATE OF CORRECTION

PATENT NO. : 9,077,619 B2  
APPLICATION NO. : 13/708265  
DATED : July 7, 2015  
INVENTOR(S) : Edsall et al.

Page 1 of 1

It is certified that error appears in the above-identified patent and that said Letters Patent is hereby corrected as shown below:

In the Claims

In Column 7, Line 4, delete "for" after "occupancy".

Signed and Sealed this  
Twenty-eighth Day of June, 2016

Michelle K. Lee  
*Director of the United States Patent and Trademark Office*